(12) United States Patent
Clark et al.

(10) Patent No.: US 8,691,315 B2
(45) Date of Patent: Apr. 8, 2014

(54) PROCESS FOR PREPARING A FOOD COMPOSITION

(75) Inventors: Joseph Robert Clark, Topeka, KS (US); Mark Lee Dierking, Omaha, NE (US)

(73) Assignee: Hill's Pet Nutrition, Inc., Topeka, KS (US)

( * ) Notice: Subject to any disclaimer, the term of this patent is extended or adjusted under 35 U.S.C. 154(b) by 1594 days.

(21) Appl. No.: 12/090,914

(22) PCT Filed: Oct. 19, 2006

(86) PCT No.: PCT/US2006/060070
§ 371 (c)(1),
(2), (4) Date: Apr. 21, 2008

(87) PCT Pub. No.: WO2007/048106
PCT Pub. Date: Apr. 26, 2007

(65) Prior Publication Data
US 2008/0299251 A1 Dec. 4, 2008

Related U.S. Application Data

(60) Provisional application No. 60/728,152, filed on Oct. 19, 2005.

(51) Int. Cl.
*A23L 1/31* (2006.01)
*A23L 1/05* (2006.01)

(52) U.S. Cl.
USPC .................. 426/574; 426/573; 426/575

(58) Field of Classification Search
USPC .................. 426/573–575, 101, 516
See application file for complete search history.

(56) References Cited

U.S. PATENT DOCUMENTS

| 3,615,589 | A |   | 10/1971 | Spek |
| 4,276,311 | A |   | 6/1981 | Burrows et al. |
| 4,362,748 | A |   | 12/1982 | Cox |
| 4,391,829 | A | * | 7/1983 | Spradlin et al. ............. 426/28 |
| 5,658,605 | A | * | 8/1997 | Soeda et al. ............. 426/7 |
| 6,436,463 | B1 |   | 8/2002 | Cheuk et al. |
| 6,440,485 | B1 |   | 8/2002 | Cheuk et al. |
| 6,685,978 | B1 | * | 2/2004 | Hauksson ............. 426/573 |
| 2003/0099759 | A1 | * | 5/2003 | Cheuk et al. ............. 426/646 |
| 2004/0081638 | A1 |   | 4/2004 | Kyle |
| 2008/0268093 | A1 |   | 10/2008 | Bowman et al. |
| 2009/0214738 | A1 |   | 8/2009 | Dierking et al. |

FOREIGN PATENT DOCUMENTS

| DE | 2945878 | 5/1981 |
| EP | 1549196 | 7/1979 |
| EP | 0173555 A2 | 5/1986 |
| EP | 1369423 | 12/2003 |
| GB | 1474629 | 5/1977 |
| GB | 1549196 | 8/1979 |
| GB | 1579324 | 11/1980 |
| GB | 2149639 A | 6/1985 |
| JP | S52-013877 A | 2/1977 |
| WO | WO 98/18349 | 5/1998 |
| WO | 9934695 A1 | 7/1999 |
| WO | 0036930 A1 | 6/2000 |
| WO | 0101792 A1 | 1/2001 |
| WO | 02096223 A1 | 12/2002 |
| WO | WO 03/007733 | 1/2003 |

OTHER PUBLICATIONS

Igoe et al., Dictionary of Food Ingredients, 2001, Springer Verlag, Fourth Edition, p. 24.*
Fennema, Food Chemistry, 1996, Marcel Dekker Inc., Third Edition, pp. 214-216.*
So, U. "Instant Sliced Rice Cake and Its Preparation by Steaming, Mixing, Coating and packaging," XP-002421533.
Association of American Feed Control Officials (AAFCO) Official Publication, 2003, pp. 126-140.
International Search Report and Written Opinion in International Application No. PCT/US06/060070 mailed Mar. 6, 2007.

* cited by examiner

*Primary Examiner* — Jyoti Chawla
(74) *Attorney, Agent, or Firm* — Thomas M. Hunter

(57) ABSTRACT

A process for preparing a food composition that is easily removed from the container by contacting one or more hydrocolloids with water to prepare a colloidal solution, contacting the colloid solution with one or more food ingredients, and allowing the resulting mixture to form a solid mass having a gelatinous texture, and a food composition produced by such process.

20 Claims, No Drawings

PROCESS FOR PREPARING A FOOD COMPOSITION

CROSS-REFERENCE TO RELATED APPLICATION

This application claims priority to U.S. Provisional Application Ser. No. 60/728,152 filed Oct. 19, 2005, the disclosure of which is incorporated herein by reference.

BACKGROUND OF THE INVENTION

1. Field of the Invention

This invention is directed generally to processes for preparing food compositions and particularly to processes for preparing food compositions that are easily removed from the container.

2. Description of the Related Art

Animals have been fed "dry" and "wet" food compositions for many years. "Wet" food compositions are generally packaged in can-like containers and are considered "wet" in appearance because of the moisture contained therein. Two types of wet food products are generally known in the art. The first is known in the art as "ground loaf." Loaf products are typically prepared by contacting a mixture of components under heat to produce an essentially homogeneous, intracellular honeycomb-type mass or "ground loaf." The ground loaf mass is then packaged into a cylindrical container, such as a can. Upon packing, ground loaf assumes the shape of the container such that the ground loaf must be cut when serving to an animal. As a result of processing, ground loaf products exhibit a wide range of textural differences and loaf products generally do not mix well with other forms of foods, especially dry products.

Another type of wet product is generally known in the art as "chunk and gravy." Chunk and gravy products comprise a preformed meat particle prepared by making a neat emulsion which is extruded and formed by physical pressure or thermal energy such as cooking with steam, cooking in water, oven dry heat and the like. A product, such as cooked meat, is diced into chunks, which are eventually mixed with a gravy or sauce. The two components are then filled into a container, usually a can, which is seamed and sterilized. As opposed to ground loaf, chunk and gravy products have physically separate, discrete chunks (i.e., pieces of ground meat and grains) as prepared. These discrete particles are present in the gravy-type liquid in the final container. When serving, chunk and gravy products flow out of the can and can be easily mixed with other dry products. While chunk and gravy products allow better integrity of the individual ingredients, the heterogeneous formulation of such products is sometimes disfavored by consumers.

U.S. Pat. Nos. 6,436,463 and 6,440,485, the entire disclosures of which are incorporated herein by reference, describe a third type of wet food composition which is a "hybrid" of the two distinct physical forms of ground loaf and chunk and gravy products. This hybrid composition has the appearance of fine ground hamburger or hash with visually recognizable discrete meat particles within an essentially homogeneous mass of the finished product which assumes the shape of its container. The product requires the inclusion of a grain component for its appearance and homogeneity: however, the grain component tends to make the product "sticky" such that it does not readily release from its storage container.

A hybrid food composition that is also readily released from the storage container, such as the can in which the composition is stored, would be advantageous. Thus, it would be desirable to provide a food composition, a hybrid of the ground loaf and chunk and gravy forms, that is readily released from its storage container.

SUMMARY OF THE INVENTION

It is, therefore, an object of the present invention to provide a process for preparing a food composition that is easily released from its container.

It is another object of the invention to provide a food composition that is easily released from its container.

These and other objects are achieved using a novel process for preparing food compositions comprising contacting one or more hydrocolloids with water to prepare a colloidal solution, contacting the colloid solution with one or more food ingredients, and allowing the resulting mixture to form a solid mass having a gelatinous texture.

Other and further objects, features, and advantages of the present invention will be readily apparent to those skilled in the art.

DETAILED DESCRIPTION OF THE INVENTION

In one aspect, the present invention provides a process for preparing a food composition. The process comprises (a) contacting one or more hydrocolloids with water to prepare a colloidal solution, (b) contacting the colloid solution with one or more food ingredients, and (c) allowing the resulting mixture to form a solid mass having a gelatinous texture. In another aspect, step (a) further comprises additionally contacting the hydrocolloid(s) with fat. In another aspect, the process further comprises (d) retorting the solid mass. The process produces a product having a gelatinous texture that is less sticky and more easily removed from a container than conventional food compositions.

In one embodiment, the food composition is a meat and carbohydrate based composition that is an essentially homogeneous mass substantially conforming to the shape of its container. The composition is produced by (a) contacting one or more hydrocolloids with water to prepare a colloidal solution, (b) contacting the colloid solution with a meat component and a carbohydrate component, and (c) allowing the resulting mixture to form an essentially homogeneous solid mass having a gelatinous texture. Generally, the composition comprises meat, carbohydrate, a hydrocolloid, and about 50% to about 90% by weight water, preferably about 60% to about 85% by weight water. The composition can be nutritionally and/or organoleptically adapted for consumption by any animal including animals of the order Carnivora. e.g., a feline or canine animal.

The composition having a gelatinous texture may also be referred to as a "hash" product form. As used herein, the term "hash" means a product that is visually a hybrid between a "loaf" and a "chunk and gravy" product form. Such a hash can have a moisturized appearance comprising essentially a solid mass with a gelatinous texture which assumes the shape of its storage container. When serving, the product form can be easily poured out of the container in which it was packed, and no cut is needed before serving. A hash further allows for easy mixing with other dry food products.

The colloidal solution is prepared by contacting a hydrocolloid with water. The optional fat can be added at this step. Any hydrocolloid that gels in the presence of divalent or monovalent cations may be used. Examples of suitable hydrocolloids that may be employed include alginates, which are derivatives of alginic acid. Alginates are hydrophilic colloids obtained from seaweed; they are used as thickeners and stabilizers in food products. Alginic acid is a polysaccharide composed of beta-D-mannuronic acid residues linked so that the carboxyl group of each unit is free, while the aldehyde group is shielded by a glycosidic linkage. Suitable alginates can be selected from the group consisting of calcium, sodium, and potassium salts of alginic acid, propylene glycol alginate, and mixtures thereof. In a particular embodiment, the hydrocolloid is sodium alginate. Other hydrocolloids useful in the invention include carrageenan, konjac, and gellan gum.

The amounts of hydrocolloid required to achieve the desired effect will vary depending on the particular hydrocolloids used. Generally, an amount of hydrocolloid sufficient to provide a relative uniform gelatinous mass in the final composition should be employed. Typical amounts range from about 0.05% to about 3%. For example, when the hydrocolloid is an alginate, a suitable amount of hydrocolloid is typically from about 0.1% to about 3% by weight of the composition. In a particular embodiment, the amount of hydrocolloid is from about 0.4% to about 1% by weight of the composition.

The process then comprises contacting the colloidal solution with one or more food ingredients for a time sufficient to achieve or essentially achieve hydration and gelatinization of carbohydrates. Typical times will depend on the ingredients and can be determined b skilled artisans. Generally, a period of from about 1 minute to about 2 hours will suffice. Preferably, the components are contacted at ambient temperatures but can be heated if desired. In one embodiment, the food ingredients are mixed before they are contacted with the colloidal solution.

In one embodiment, the resulting mixture may be further contacted with a calcium source. The calcium source may generally be any form of calcium compatible with the processing conditions and which is suitable for animal consumption, e.g., calcium or calcium chloride. The calcium source is typically added in an amount of from about 0.1 to about 1.0 by dry weight of the composition.

For prior art compositions, the starch in the carbohydrate component often prevents release of the final product from its container. Thus, in one embodiment, the process of the present invention further comprises adding one or more enzymes that digest carbohydrate to the mixture of the colloidal solution and the food ingredients. Examples of suitable enzymes include amylases such as 0.1% Ban 240L from Novo Enzymes. The enzyme or enzyme mixture is typically active at temperatures of from about 160° F. (71° C.) to about 210° F. (99° C.), preferably from about 167° F. (75° C.) to about 200° F. (93° C.).

Additional water may also be added to the mixture until an essentially uniform, colloidal mass having the desired texture is produced. The final product is then placed in containers and sealed. The mixture may also be retorted for sterility.

In an illustrative process of this invention, the process comprises preparing a meat mixture or a meat component in a mixer. The meat mixture is transferred to a second mixer. A carbohydrate mixture comprising one or more carbohydrate sources (i.e., a carbohydrate component) is prepared in a mixer and transferred to the second mixer. A colloidal solution is prepared separately from the meat mixture and the carbohydrate (grain) mixture by contacting a hydrocolloid with water (an optional fat) in a third mixer. The colloidal solution is then transferred to the second mixer. The meat mixture, carbohydrate mixture, and colloidal solution are all mixed together in the second mixer for a time and at a temperature sufficient to result in an essentially homogeneous mass. The essentially homogeneous mass produced in the second mixer is then further processed for partitioning into containers using a filler.

The meat mixture can be prepared from a wide variety of meats or meat sources including, for example, meat sources selected from the group consisting of animal muscle, animal skeletal meat, animal by-products, and mixtures of muscle, skeletal meat and by-products. Meats include, for example, the flesh of poultry; fish; and mammals (e.g., cattle, swine, sheep, goats, and the like). Meat by-products include, for example, lungs, kidneys, livers, tongues, stomachs and intestines. Suitable meat sources may include fresh and frozen meats or meat by-products. The meat mixture is generally prepared by grinding the meat through different grind-plates, typically ranging from about ½ inch to about 1 inch in size, to form the discrete food particles required for the finished product.

The prepared meat mixture or meat component for inclusion in the composition generally comprises at least about 15% by weight protein and about 25% by weight fat. For example, in one embodiment, the meat mixture comprises one or more animal protein sources such that the mixture comprises from about 15% to about 25% protein, from about 5% to about 15% by weight fat, and from about 55% to about 75% by weight water.

The meat mixture may be prepared in any suitable mixing apparatus known to one skilled in the art. Non-limiting examples of suitable apparatus for preparing the meat component include a train screw mixer, a twin ribbon mixer, an overlapping paddle mixer, or a combination mixer such as a screw/ribbon/paddle.

The carbohydrate component comprises a mixture of one or more carbohydrate sources. Suitable carbohydrate sources include, for example, carbohydrates selected from the group consisting of oat fiber, cellulose, peanut hull, beet pulp, parboiled rice, corn starch, corn gluten meal and mixtures thereof. It is important to note that by properly balancing carbohydrate sources, one skilled in the art can manipulate the texture of the final product. For example, short chain polysaccharides lend to be sticky and gluey and longer chain polysaccharides are less sticky and gluey than the shorter chain. Basically the desired texture of this hybrid food is achieved by longer chain polysaccharide and modified starches such as native or modified starches, cellulose and the like.

The carbohydrate mixture may additionally comprise optional components such as added salt, spices, seasonings, vitamins, minerals, flavorants, colorants, and the like. The amount of the optional additives is at least partially dependent on the nutritional requirements for different life stages of animals. For example, the Association of American Feed Control Officials (AAFCO), for example, provides recommended amounts of such ingredients for dogs and cats. See AAFCO Official Publication, pp. 126-140 (2003). Contemplated vitamins generally useful as food additives include, for example, vitamin A, vitamin B1, vitamin B2, vitamin B6, vitamin B12, vitamin C, vitamin D, vitamin E, vitamin H (biotin), vitamin K, folic acid, inositol, niacin, and pantothenic acid. Contemplated minerals and trace elements generally useful as food additives include, for example, calcium, phosphorus, sodium, potassium, magnesium, copper, zinc, choline, and iron salts.

In one embodiment, the composition may be a food composition that provides a substantially nutritionally complete diet for an animal. A "nutritionally complete diet" is a diet that includes sufficient nutrients for maintenance of normal health of a healthy animal on the diet.

The animal food compositions of this invention generally have a texture that visually is a hybrid between a ground loaf and chunk and gravy product. The composition has a moisturized appearance comprising essentially a solid mass with a gelatinous texture which assumes the shape of its storage container. When serving, the product form can be easily poured out of the container in which it was packed, and no cut is needed before serving. The composition of the present invention further allows for easy mixing with other dry food products.

The animal to which the composition is fed can be human or non-human. In various embodiments, the animal is a vertebrate, for example a fish, a bird, a reptile or a mammal. Illustratively among mammals, the animal can be a member of the order Carnivora, including without limitation canine and feline species.

In a particular embodiment, the animal is a companion animal. A "companion animal" herein is an individual animal of any species kept by a human caregiver as a pet, or any individual animal of a variety of species that have been widely domesticated as pets, including dogs (*Canis familiaris*) and cats (*Felis domesticus*), whether or not the individual animal is kept solely or partly for companionship. Thus, "companion animals" herein include working dogs, farm cats kept for rodent control, etc., as well as pet dogs and cats.

Notwithstanding these illustrative embodiments, the methods of this invention also are generally suitable for other mammals, including non-human mammals such as non-human primates (e.g., monkeys, chimpanzees, etc.), companion and working animals (e.g., horses, etc.), farm animals (e.g., goats, sheep, pigs, cattle, etc.), and wild and zoo animals (e.g. wolves, bears, deer, etc.). The methods of this invention also are generally suitable for use with non-mammalian animals, such as companion, farm, zoo, and wild birds, (including, for example, song birds, parrots, ducks, geese, chickens, turkeys, ostriches, etc.).

This invention further provides a composition for consumption by an animal, the composition having a moisturized appearance and comprising meat, carbohydrates, and a hydrocolloid. The composition is further nutritionally and/or organoleptically adapted for consumption by an animal of the order Carnivora.

The composition generally comprises the hydrocolloid in an amount of about 0.1% to about 3% by weight of the composition on a dry matter basis. In a particular embodiment, the hydrocolloid comprises an alginate, e.g., sodium alginate.

Although not essential to the invention, the compositions prepared by the process of the present invention generally comprise:

| Component | |
|---|---|
| Meat | about 25% to about 75% by weight (or about 30% to about 60% by weight) |
| Carbohydrates | about 2% to about 25% by weight (or about 8% to about 20% by weight) |
| Vitamins, Minerals, Colorant, Flavor | 0% to about 5% by weight (or about 1% to about 3% by weight) |

The meat component, carbohydrate component and colloidal solution are contacted in any suitable mixer. Examples of suitable mixing apparatus include a twin screw mixer, a twin ribbon mixer, or an overlapping paddle mixer. The mixing should be vigorous enough to ensure that the individual components are formed into a single entity for further processing and partitioning into containers.

The final mixture can be filled into cans which are then sealed and sterilized. Additional water may also be added to the mixture until an essentially uniform, colloidal mass is produced having the desired texture. The final product can be then placed in containers, seamed, and possibly retorted for sterility.

EXAMPLES

This invention can be further illustrated by the following examples of preferred embodiments thereof, although it will be understood that these examples are included merely for purposes of illustration and are not intended to limit the scope of the invention unless otherwise specifically indicated.

A meat mixture was prepared by homogeneously mixing skeletal muscle from poultry (chicken) and swine (pork liver) in a ribbon/paddle mixer. The meat sources were added to the mixer in an amount sufficient to provide about 30% of the total weight of finished product. The meat mixture comprised about 73% moisture, 16% protein, and 9% fat.

A carbohydrate mixture was prepared by contacting corn and soybean meal with minerals, vitamins, colorant and flavor. The corn and soybean meal were added in an amount sufficient to provide about 18% by weight of the final product.

Sodium alginate was mixed with water (under agitation and thoroughly hydrated at ambient temperature to prepare a sodium alginate solution comprising 11% sodium alginate.

The meat mixture, carbohydrate mixture, and sodium alginate solution were evenly blended in a regular mixer without heating. The resulting composite was further mixed with a calcium source (0.4% calcium chloride) and immediately mechanical shear is provided to reduce the long alginate chains by adding water and 0.1% amylase. The final mixture was filled into cans, sealed and sterilized.

The ingredient profile of the final composition is shown in Table 1.

TABLE 1

| Composition Ingredient Profile | |
|---|---|
| Ingredient | Amount (%) |
| Water | 49.886 |
| Chicken, low fat | 24.700 |
| Corn, white, yellow | 12.239 |
| Soybean meal | 5.9027 |
| Liver, pork edible | 5.0000 |
| Choline chloride | 0.4499 |
| Sodium alginate | 0.8000 |
| Calcium chloride | 0.4000 |
| Dicalcium phosphate | 0.1789 |
| Calcium carbonate | 0.1525 |
| Potassium chloride | 0.1324 |
| Guar gum | 0.1000 |
| Amylase | 0.1000 |
| Chicken fat edible liquid | 0.0538 |
| Mineral mix | 0.0500 |
| Vitamin mix | 0.0400 |

The mixture assumes the shape of the container when placed in the container and is easily removed from the container compared to prior art compositions.

This invention is not limited to the particular methodology, protocols, and reagents described herein because they may vary. Further, the terminology used herein is for the purpose of describing particular embodiments only and is not intended to limit the scope of the present inventions. As used herein and in the appended claims, the singular forms "a," "an," and "the" include plural reference unless the context clearly dictates otherwise, e.g., reference to "a palatant" includes a plurality of such palatants or reference to pieces includes a single piece. The words "comprise", "comprises", and "comprising" are to be interpreted inclusively rather than exclusively.

Unless defined otherwise, all technical and scientific terms and any acronyms used herein have the same meanings as commonly understood by one of ordinary skill in the art in the field of the invention. Although any methods and materials similar or equivalent to those described herein can be used in the practice of the present invention, the preferred methods, devices, and materials are described herein.

All patents, patent applications, and publications mentioned herein are incorporated herein by reference to the extent allowed by law for the purpose of describing and disclosing the compounds and methodologies reported therein that might be used with the present invention. However, nothing herein is to be construed as an admission that the invention is not entitled to antedate such disclosure by virtue of prior invention.

In the specification, there have been disclosed typical preferred embodiments of the invention and, although specific terms are employed, they are used in a generic and descriptive sense only and not for purposes of limitation, the scope of the invention being set forth in the following claims. Obviously many modifications and variations of the present invention are possible in light of the above teachings. It is therefore to be understood that within the scope of the appended claims the invention may be practiced otherwise than as specifically described.

What is claimed is:

1. A process for preparing a food composition comprising:
   (a) contacting one or more hydrocolloids with water and a fat to prepare a colloidal solution;
   (b) contacting the colloidal solution with a meat component and a carbohydrate component, wherein the meat component and the carbohydrate component are mixed prior to contact with the colloidal solution;
   (c) contacting a source of calcium with the mixture formed by contacting the meat components and the carbohydrate component with the colloidal solution; and
   (d) forming a solid homogeneous mass having a gelatinous texture by allowing the colloidal solution, the meat component and the carbohydrate component to contact one another until gelatinization occurs, wherein the solid homogeneous mass substantially conforms to the shape of its container.

2. The process of claim 1 further comprising (e) retorting the solid mass.

3. The process of claim 1 wherein the meat component comprises one or more meat sources selected from the group consisting of animal muscle, animal skeletal meat, animal by-products, and mixtures thereof.

4. The process of claim 1 wherein the carbohydrate component comprises one or more carbohydrate sources selected from the group consisting of oat fiber, cellulose, peanut hull, beet pulp, parboiled rice, cornstarch, corn gluten meal and mixtures thereof.

5. The process of claim 1 wherein the hydrocolloid is selected from the group consisting of alginates, carrageenan, konjac gellan gum, and mixtures thereof.

6. The process of claim 1 wherein the hydrocolloid comprises an alginate.

7. The process of claim 1 wherein the hydrocolloid is sodium alginate.

8. The process of claim 1 wherein the source of calcium is calcium chloride.

9. The process of claim 1 wherein the process further comprises contacting the mixture of food ingredients and colloidal solution with at least one enzyme.

10. The process of claim 9 wherein the enzyme is selected from the group consisting of amylases, proteases, and mixtures thereof.

11. The process of claim 1 wherein the food composition is nutritionally and/or organoleptically adapted for consumption by an animal of the order Carnivora.

12. The process of claim 11 wherein the animal is a feline or canine.

13. A food composition comprising one or more food ingredients, a hydrocolloid, and from about 50% to about 90% by weight of water, wherein the food composition is in a form of a solid mass that assumes the shape of its container, and wherein the food composition is a product of the process of claim 1.

14. The composition of claim 13 wherein the food ingredients comprise a meat component and at least one carbohydrate component.

15. The composition of claim 14 wherein the composition comprises up to 75% by weight meat.

16. The composition of claim 14 wherein the composition comprises from about 10 to about 50% by weight carbohydrate.

17. The composition of claim 13 wherein the composition comprises from about 0.1% to about 3% hydrocolloid by weight on a dry matter basis.

18. The composition of claim 17 wherein the hydrocolloid comprises an alginate.

19. The composition of claim 17 wherein the hydrocolloid comprises sodium alginate.

20. The product of the process of claim 1.

* * * * *